US011836474B2

(12) United States Patent
Samuel et al.

(10) Patent No.: US 11,836,474 B2
(45) Date of Patent: Dec. 5, 2023

(54) APPLYING A FIRMWARE UPDATE BASED ON POWER REQUIREMENT

(71) Applicant: Dell Products L.P., Round Rock, TX (US)

(72) Inventors: Balasingh P Samuel, Round Rock, TX (US); Adolfo Sandor Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 254 days.

(21) Appl. No.: 17/452,462

(22) Filed: Oct. 27, 2021

(65) Prior Publication Data

US 2023/0127992 A1   Apr. 27, 2023

(51) Int. Cl.
*G06F 9/44* (2018.01)
*G06F 8/65* (2018.01)
*G06F 11/30* (2006.01)
*G06F 21/57* (2013.01)

(52) U.S. Cl.
CPC ............ *G06F 8/65* (2013.01); *G06F 11/3062* (2013.01); *G06F 21/572* (2013.01)

(58) Field of Classification Search
CPC ....................................................... G06F 8/65

USPC .......................................................... 717/168
See application file for complete search history.

(56) References Cited

U.S. PATENT DOCUMENTS

| | | | |
|---|---|---|---|
| 9,952,645 B2 * | 4/2018 | Chung | G06F 1/30 |
| 9,996,142 B2 * | 6/2018 | Bulusu | G06F 8/654 |
| 2011/0231834 A1 * | 9/2011 | Kim | G06F 8/65 717/173 |

* cited by examiner

*Primary Examiner* — Evral E Bodden
(74) *Attorney, Agent, or Firm* — McDermott Will & Emery LLP (57) ABSTRACT

Applying a firmware update, including: receiving a firmware update package, the firmware update package including multiple payloads and a firmware update duration map; verifying an integrity of the firmware update duration map, and in response, extracting the firmware update duration map from the firmware update package; determining, at a first time, a first power required to apply a first payload of the firmware update package based at least on the firmware update duration map and a health of a battery; comparing a current power capacity of the battery with the first power required to apply the first payload of the firmware update package; determining that the current power capacity of the battery is greater than the first power required to apply the first payload, and in response: obtaining the first payload of the firmware update package; updating firmware by applying the first payload to the firmware.

20 Claims, 4 Drawing Sheets

APPLYING A FIRMWARE UPDATE BASED ON POWER REQUIREMENT

BACKGROUND

Field of the Disclosure

The disclosure relates generally to an information handling system, and in particular, applying a firmware update at the information handling system based on power requirements.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Basic Input/Output System (BIOS) flash images are monolithic payloads that can be cumbersome to install.

SUMMARY

Innovative aspects of the subject matter described in this specification may be embodied in a method of applying a firmware update, the method including receiving a firmware update package, the firmware update package including multiple payloads and a firmware update duration map; verifying an integrity of the firmware update duration map; in response to verifying the integrity of the firmware update duration map, extracting the firmware update duration map from the firmware update package; determining, at a first time, a first power required to apply a first payload of the firmware update package based at least on the firmware update duration map and a health of a battery of the information handling system; comparing a current power capacity of the battery of the information handling system with the first power required to apply the first payload of the firmware update package; determining that the current power capacity of the battery of the information handling system is greater than the first power required to apply the first payload of the firmware update package, and in response: obtaining the first payload of the firmware update package; and updating firmware at the information handling system by applying the first payload of the firmware update package to the firmware.

Other embodiments of these aspects include corresponding systems, apparatus, and computer programs, configured to perform the actions of the methods, encoded on computer storage devices.

These and other embodiments may each optionally include one or more of the following features. For instance, after receiving the firmware update package, staging the payloads of the firmware update package; and setting a flag indicating that the payloads of the firmware update package have been staged. In response to determining that the current capacity of the battery of the information handling system is greater than the power required to apply the first payload of the firmware update package, determining whether the flag is set to indicate that the payloads of the firmware update package have been staged; in response to determining that the flag is set to indicate that the payloads of the firmware update package have been staged, obtaining the first individual payload of the firmware update package; determining, at a second time after the first time, a second power required to apply the first payload of the firmware update package based at least on the firmware update duration map and the health of the battery of the information handling system; comparing the current power capacity of the battery of the information handling system with the second power required to apply the first payload of the firmware update package; and determining that the current capacity of the battery of the information handling system is greater than the second power required to apply the first payload of the firmware update package, and in response, updating the firmware at the information handling system by applying the first payload of the firmware update package to the firmware. In response to determining that the current capacity of the battery of the information handling system is greater than the second power required to apply the first payload of the firmware update package, obtaining the first payload of the firmware update package; determining an integrity of the first payload of the firmware update package; in response to determining the integrity of the first payload of the firmware update package, updating the firmware at the information handling system by applying the first payload of the firmware update package to the firmware; determining whether the firmware update package includes additional individual payloads; and in response to determining that the firmware update package does not include additional individual payloads, clearing the flag indicating that the payloads of the firmware update package have been staged. In response to determining that the firmware update package includes additional individual payloads, identifying a second payload of the firmware update package; determining, at a third time after the second time, a third power required to apply the second payload of the firmware update package based at least on the firmware update duration map and the health of the battery of the information handling system; comparing the current power capacity of the battery of the information handling system with the third power required to apply the second payload of the firmware update package; and determining that the current capacity of the battery of the information handling system is greater than the third power required to apply the second payload of the firmware update package, and in response, updating the firmware at the information handling system by applying the second payload of the firmware update package to the firmware. In response to determining that the current capacity of the battery of the information handling system is greater than the first power required to apply the first payload of the firmware update package, providing a notification to a display device of the information handling system indicating an approval status of applying the first payload of the firmware update package to the firmware; and in response to provide the notification, receiving user-input indicating approval of applying the first payload of the firmware update package to the firmware. In response to receiving the user-input indicating the approval of applying the first payload of the firmware update package to the firmware, rebooting the information handling system. Determining that the current capacity of the battery of the information handling system is less than the first power required to apply the first payload of the firmware update package, and in response, registering for a notification when the current capacity of the battery of the information handling system is greater than the first power required to apply the first payload of the firmware update package.

Particular implementations of the subject matter described in this specification can be implemented so as to realize one or more of the following advantages. For example, cryptographic protection of energy level use data for each module is provided to prevent denial of service attacks; allowing flashing of unique components; dynamic threshold of battery capacity needed based on amount of energy needed for the flash operation; and automatic firmware update of selected modules when the battery energy level reaches a required threshold.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for updating firmware of an information handling system. In short, firmware updates can be disaggregated to allow update of individual components (update firmware as multiple separate modules). The power required to apply disaggregated payloads of the firmware update can be based on a size of the payload, speed of applying the payload, power consumption per second during application of the payload, battery health, and current baseline power range.

Specifically, this disclosure discusses a system and a method for applying a firmware update, including receiving a firmware update package, the firmware update package including multiple payloads and a firmware update duration map; verifying an integrity of the firmware update duration map; in response to verifying the integrity of the firmware update duration map, extracting the firmware update duration map from the firmware update package; determining, at a first time, a first power required to apply a first payload of the firmware update package based at least on the firmware update duration map and a health of a battery of the information handling system; comparing a current power capacity of the battery of the information handling system with the first power required to apply the first payload of the firmware update package; determining that the current power capacity of the battery of the information handling system is greater than the first power required to apply the first payload of the firmware update package, and in response: obtaining the first payload of the firmware update package; and updating firmware at the information handling system by applying the first payload of the firmware update package to the firmware.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
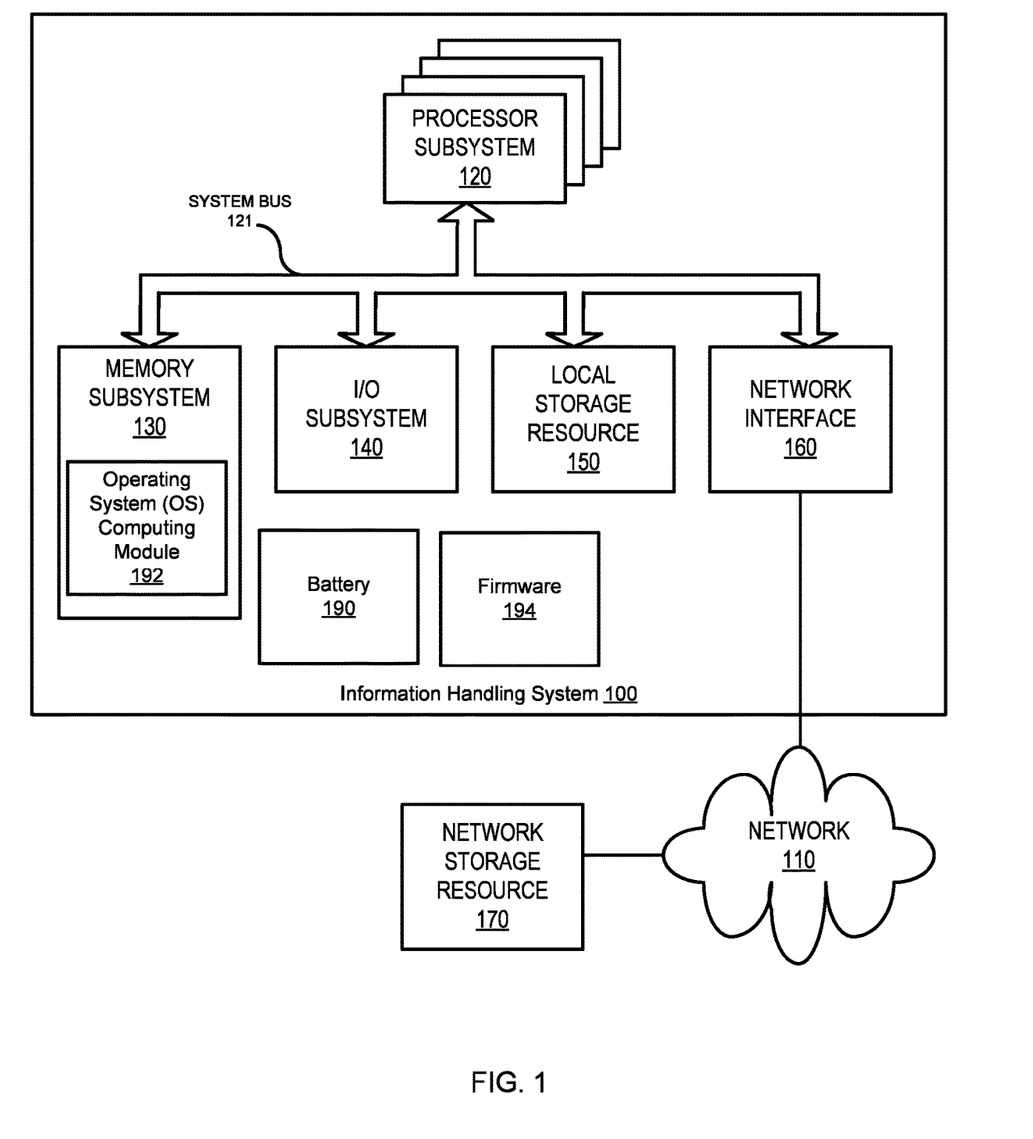
FIG. 1 is a block diagram of selected elements of an embodiment of an information handling system.
Figure 2:
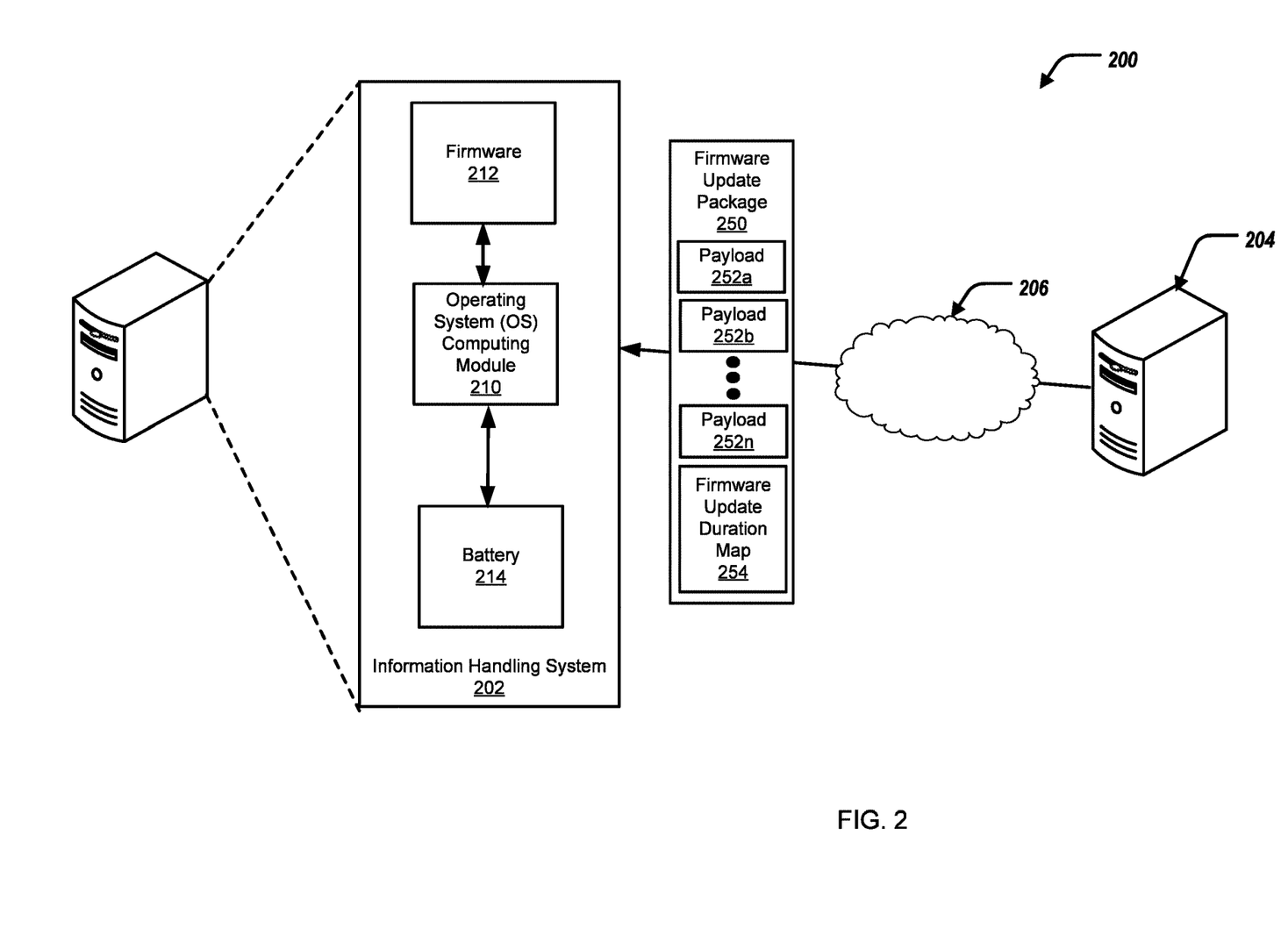
FIG. 2 illustrates a block diagram of an information handling system for updating firmware.
Figure 3A:
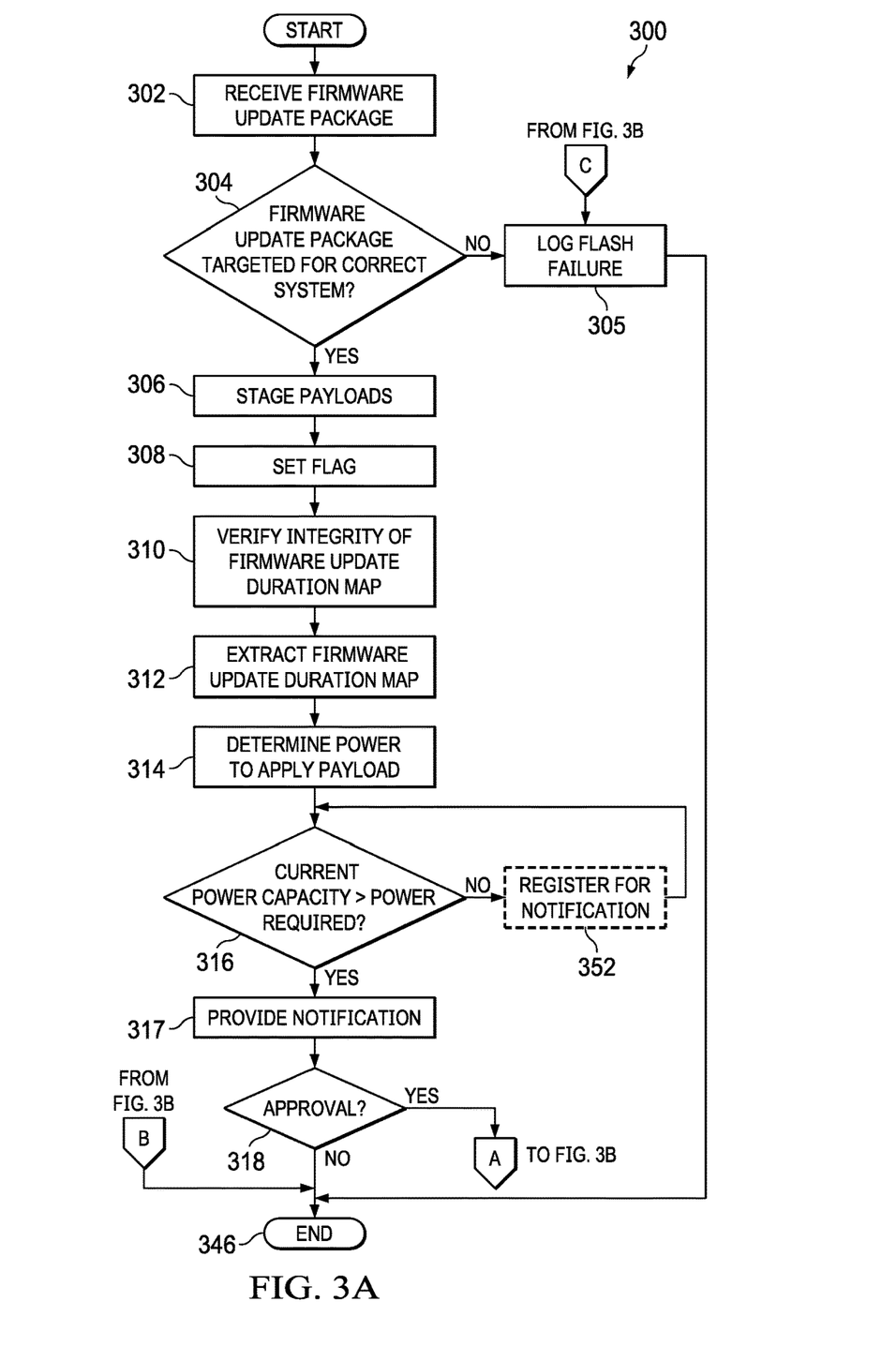
FIGS. 3A, 3B illustrate a method for updating firmware at the information handling system.
Figure 3B:
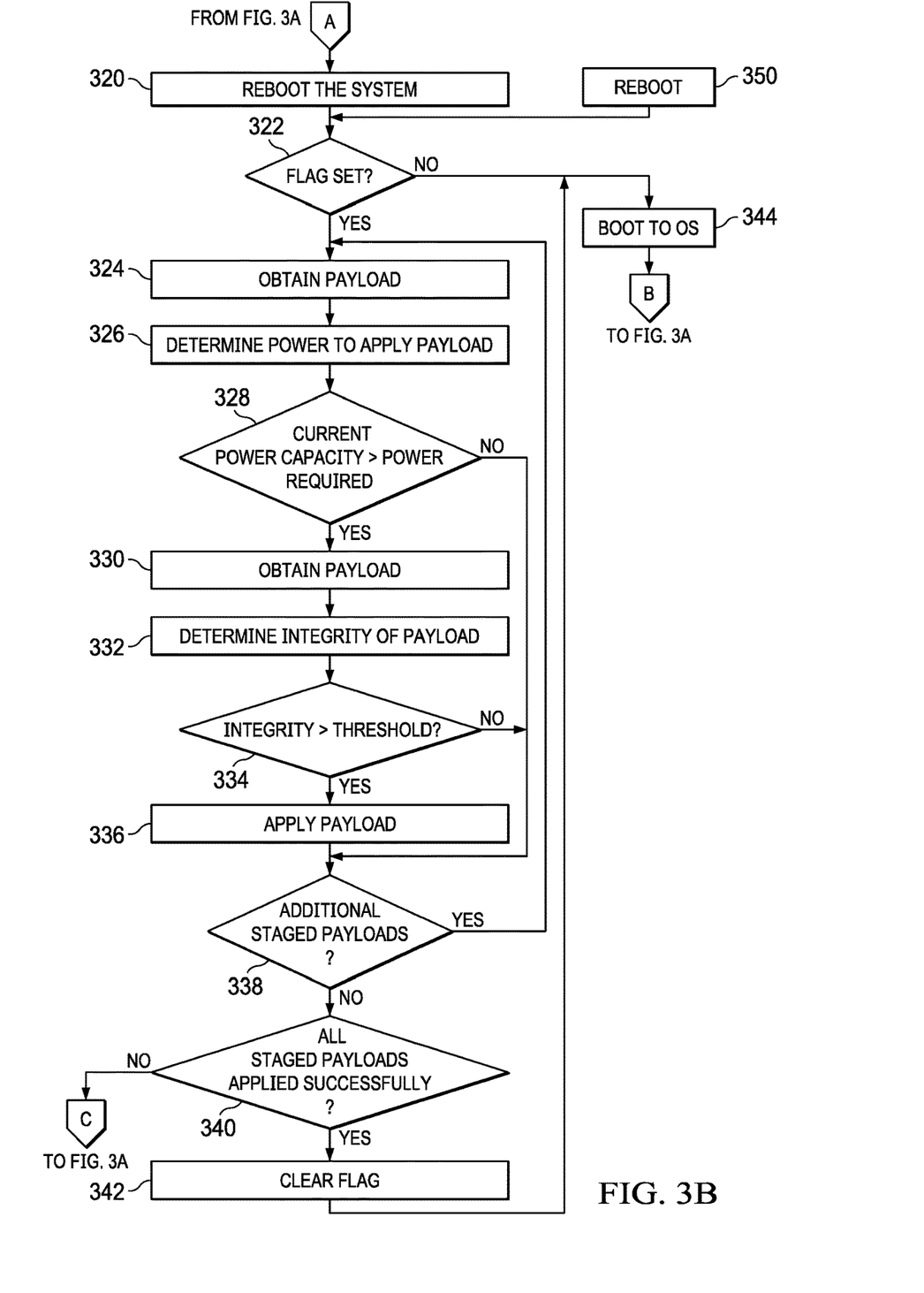

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

The information handling system 100 can further include a battery 190.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include an operating system (OS) computing module 192. The OS computing module 192 can be included by the memory subsystem 130. The OS computing module 192 can include a computer-executable program (software). The OS computing module 192 can be executed by the processor subsystem 120.

The information handling system 100 can further include firmware 194. The firmware 194 can include a basic input/output system (BIOS) for hardware initialization during the boot process of the information handling system 100, and provide runtime services to the OS computing module 192.

In short, firmware updates can be disaggregated to allow update of individual components (update firmware as multiple separate modules). The power required to apply disaggregated payloads of the firmware update can be based on a size of the payload, speed of applying the payload, power consumption per second during application of the payload, battery health, and current baseline power range.

Turning to FIG. 2, FIG. 2 illustrates an environment 200 including an information handling system 202 and a cloud information handling system 204. The cloud information handling system 204 can be in communication with the information handling system 202 over a network 206 (e.g., the Internet). The information handling system 202 can include an operating system (OS) computing module 210, firmware 212, and a battery 214. In some examples, the information handling system 202 is similar to, or includes, the information handling system 100 of FIG. 1. In some examples, the OS computing module 210 is the same, or substantially the same, as the OS computing module 192 of FIG. 1. In some examples, the firmware 212 is the same, or substantially the same, as the firmware 194 of FIG. 1. In some examples, the battery 214 is the same, or substantially the same, as the battery 190 of FIG. 1.

The OS computing module 210 can be in communication with the battery 214 and the firmware 212.

In some examples, the firmware 212 is basic input/output system (BIOS) firmware.

FIGS. 3A, 3B illustrates a flowchart depicting selected elements of an embodiment of a method 300 for updating the firmware 212 at the information handling system 202. The method 300 may be performed by the information handling system 100, the information handling system 202, the OS computing module 210, and/or the firmware 212, and with reference to FIGS. 1-2. It is noted that certain operations described in method 300 may be optional or may be rearranged in different embodiments.

The information handling system 202 receives a firmware update package 250, at 302. The firmware update package 250 can include multiple payloads 252a, 252b, . . . , 252n (collectively referred to as payloads 252) and a firmware update duration map 254.

In some examples, the payloads 252 can include ME image, BIOS image, EC image, PD images, Gig-Ethernet image, and/or TPM image.

In some examples, the firmware update duration map 254 includes, for one or more parameters of the payload 252, an associated install time of the payload for one or more differing types of connections. For example, the parameters of the payload 252 can include version and size. For example, the types of connections can include enhanced serial peripheral interface (eSPI), Inter-Integrated Circuit (I2C), and C-C bus. An example firmware update duration map 254 is shown below as Table 1:

TABLE 1

| Payload Name | Version | Size | eSPI | I2C | CC |
|---|---|---|---|---|---|
| Type-C Firmware | Version Number A | A | Time1 | Time2 | Time3 |
| ME | Version Number B | B | Time4 | Time5 | Time6 |
| Memory Reference | Version Number C | C | Time7 | Time8 | Time9 |
| Chipset Code | Version Number D | D | Time10 | Time11 | Time12 |

TABLE 1-continued

| Payload Name | Version | Size | eSPI | I2C | CC |
|---|---|---|---|---|---|
| CPU Micro Code | Version Number E | E | Time13 | Time14 | Time15 |
| EC | Version Number F | F | Time16 | Time17 | Time18 |

In some examples, the firmware update duration map 254 is signed using a private key from a secure server (e.g., to protect against denial of service attacks).

The OS computing module 210 can determine whether the firmware update package 250 is targeted for the correct information handling system, at 304. That is, the OS computing module 210 can determine whether the firmware update package 250 is targeted for the information handling system 202. When the OS computing module 210 determines that the firmware update package 250 is not targeted for the information handling system 202, a flash failure is logged, at 305.

When the OS computing module 210 determines that the firmware update package 250 is targeted for the information handling system 202, the OS computing module 210 stages the payloads 252 of the firmware update package 250, at 306. That is, after receiving the firmware update package 250, the OS computing module 210 stages the payloads 252 of the firmware update package 250. The OS computing module 210 can stage the payloads 252 to an extensible firmware interface (EFI) system partition (ESP) of a hard drive of the information handling system 202, or can stage the payloads 252 to storage that is accessible to preboot firmware of the information handling system 202.

The OS computing module 210 can set a flag indicating that the payloads 252 of the firmware update package 250 have been staged, at 308. For example, the OS computing module 210 can set a "firmware is staged" flag to TRUE.

The OS computing module 210 can verify an integrity of the firmware update duration map 254, at 310. The OS computing module 210, in response to verifying the integrity of the firmware update duration map 254, can extract the firmware update duration map 254 from the firmware update package 250, at 312.

The OS computing module 210 can determine, at a first time, a first power required to apply a first payload 252 of the firmware update package 250 based at least on the firmware update duration map 254 and a health of the battery 214 of the information handling system 202, at 314. For example, the OS computing module 210 can determine the first power required to apply the first payload 252 of the firmware update package 250 based on, among others, a current capacity (Watts) of the battery 214, current baseline power (Watts) of the information handling system 202, a chipset modifier (Watts), power consumption per second (Watts/second) of the first payload 242, a number of seconds to apply the first payload 252, a size of the first payload 252 (Kilobytes), and a speed of applying the first payload 252 (Kilobytes/second). For example, the OS computing module 210 can determine the first power required to apply the first payload 252 of the firmware update package 250 based on the equations below:

First Power=Current Capacity (Watts) of the battery 214−[Total Power (Watts)+Engineering Margin (Watts)]  (1)

Total Power=Current Baseline Power (Watts) of the information handling system 202+Chipset Modifier (Watts)+Additional Power (Watts)  (2)

Additional Power=Power Consumption *per* Second
(Watts/second)×Number of Seconds to Apply
the first payload 252     (3)

Number of Seconds=Size of the First Payload 252
(Kilobytes)/Speed of Applying the first payload
252 (Kilobytes/second)     (4)

In some examples, the additional power can be platform power of the information handling system 202, such as power associated with a display device, hard drives, ports, etc. In some examples, the engineering margin is determined at runtime based on battery health and current baseline power consumption.

The OS computing module 210 compares a current power capacity of the battery 214 with the first power required to apply the first payload 252 of the firmware update package 250, at 316. In some examples, the OS computing module 210 determines that the current power capacity of the battery 214 is greater than the first power required to apply the first payload 252 of the firmware update package 250, and in response, provides a notification to a display of the information handling system indicating an approval status of applying the first payload 252 of the firmware update package 250 to the firmware 212, at 317. In response to the notification, the OS computing module 210 can determine whether user-input responsive to the notification indicates approval of applying the first payload 252 of the firmware update package 250 to the firmware 214, at 318. In some examples, the OS computing module 210 can receive user input indicating an approval of applying the first payload 252 of the firmware update package 250 to the firmware 214, and in response, reboot the information handling system 202, at 320. In some examples, the OS computing module 210 does not receive user input indicating an approval of applying the first payload 252 of the firmware update package 250 to the firmware 214, and in response, the process ends, at 346.

In some examples, optionally, the OS computing module 210 determines that the current power capacity of the battery 214 is less than the first power required to apply the first payload 252 of the firmware update package 250, and in response, registers for a notification when the current capacity of the battery 214 is greater than the first power to apply the first payload of the firmware update package, at 352.

In some examples, the OS computing module 210 determines that the current power capacity of the battery 214 is less than the first power required to apply the first payload 252 of the firmware update package 250, and in response, returns to step 316.

After rebooting the information handling system 202 at 320, the firmware 212 determines whether the flag is set to indicate that the payloads 252 of the firmware update package 250 have been staged, at 322. For example, the firmware 214 can determine whether the "firmware is staged" flag is set to TRUE. In some examples, when the firmware 212 determines that the flag is not set to indicate that the payloads 252 of the firmware update package 250 have been staged, the firmware 214 boots to the OS, at 344. In some examples, when the firmware 212 determines that the flag is set to indicate that the payloads 252 of the firmware update package 250 have been staged, the firmware 212 obtains the first payload 252 of the firmware update package 250, at 324. For example, the firmware 212 can read the first payload 242 from the ESP of a hard drive of the information handling system 202, or a temporary storage area of the information handling system 202.

The firmware 212 can determine, at a second time after the first time, a second power required to apply the first payload 252 of the firmware update package 250 based at least on the firmware update duration map 254 and a health of the battery 214 of the information handling system 202, at 326, similar to step 314. The firmware 212 can compare a current power capacity of the battery 214 with the second power required to apply the first payload 252 of the firmware update package 250, at 328, similar to step 316.

The firmware 212, in response to determining that the current capacity of the battery 214 is greater than the second power required to apply the first payload 252 of the firmware update package 250, can obtain the first payload 252, at 330. That is, the firmware 212 can read the first payload 252 from the ESP of a hard drive of the information handling system 202, or a temporary storage area of the information handling system 202. The firmware 212 can determine an integrity of the first payload 252 of the firmware update package 250, at 332. The firmware 212 can determine whether the integrity of the first payload 252 is greater than a threshold (or the integrity is a success or a failure), at 334. In some examples, when the firmware 212 determines that the integrity of the first payload 252 is greater than the threshold, the firmware 212 is updated by applying the first payload 252 of the firmware update package 250 to the firmware 212, at 336. In some examples, optionally, the firmware can additionally delete the first payload 252 from temporary storage of the information handling system 202.

The firmware 212 can determine whether additional payloads 252 of the firmware update package 250 are staged, at 338. When the firmware 212 determines that there are no further additional payloads 252 of the firmware updating package 250 that are staged, the firmware 212 determines whether all staged payloads 252 have been applied successfully, at 340. When the firmware 212 determines that all staged payloads 252 have been applied successfully, the firmware 212 clears the flag indicating that the payloads 252 of the firmware update package 250 have been staged, at 340. For example, the firmware 212 can set a "firmware is staged" flag to FALSE. The firmware 212 then boots to the OS, at 344.

In some examples, when the firmware 212 determines that not all staged payloads 252 have been applied successfully, the firmware 212 logs a flash failure, at 305.

In some examples, the firmware 212, in response to determining that the current capacity of the battery 214 is less than the second power required to apply the first payload 252 of the firmware update package 252 (at 328), the flow can proceed to step 338.

In some examples, when the firmware 212 determines that the integrity of the first payload 252 is less than the threshold (at 334), the flow can proceed to step 338.

In some examples, the information handling system 202 is rebooted (by a user or software), at 350, and proceeds to step 322.

In some examples, when the firmware 212 determines that there are further additional payloads 252 of the firmware updating package 250 that are staged (at 338), the firmware 212 obtains a second payload 252 of the firmware update package 250, at 324. For example, the firmware 212 can read the second payload 252 from the ESP of a hard drive of the information handling system 202, or a temporary storage area of the information handling system 202. The firmware 212 can determine, at a third time after the second time, a third power required to apply the second payload 252 of the firmware update package 250 based at least on the firmware update duration map 254 and a health of the battery 214 of the information handling system 202, at 326. The firmware 212 can compare a current power capacity of the battery 214 with the second power required to apply the second payload 252 of the firmware update package 250, at 328. The flow can then proceed, with ultimately the firmware 212 determining that the current capacity of the battery 214 is greater than the third power required to apply the second payload 252 of the firmware update package 250, and in response, the firmware 212 is updated by applying the second payload 252 of the firmware update package 250 to the firmware 212, at 336.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of applying a firmware update, the method comprising:
   receiving a firmware update package, the firmware update package including multiple payloads and a firmware update duration map;
   verifying an integrity of the firmware update duration map;
   in response to verifying the integrity of the firmware update duration map, extracting the firmware update duration map from the firmware update package;
   determining, at a first time, a first power required to apply a first payload of the firmware update package based at least on the firmware update duration map and a health of a battery of the information handling system;
   comparing a current power capacity of the battery of the information handling system with the first power required to apply the first payload of the firmware update package;
   determining that the current power capacity of the battery of the information handling system is greater than the first power required to apply the first payload of the firmware update package, and in response:
      obtaining the first payload of the firmware update package; and
      updating firmware at the information handling system by applying the first payload of the firmware update package to the firmware.

2. The computer-implemented method of claim 1, further comprising:
   after receiving the firmware update package, staging the payloads of the firmware update package; and
   setting a flag indicating that the payloads of the firmware update package have been staged.

3. The computer-implemented method of claim 2, further comprising:
   in response to determining that the current capacity of the battery of the information handling system is greater than the power required to apply the first payload of the firmware update package, determining whether the flag is set to indicate that the payloads of the firmware update package have been staged;
   in response to determining that the flag is set to indicate that the payloads of the firmware update package have been staged, obtaining the first payload of the firmware update package;
   determining, at a second time after the first time, a second power required to apply the first payload of the firmware update package based at least on the firmware update duration map and the health of the battery of the information handling system;
   comparing the current power capacity of the battery of the information handling system with the second power required to apply the first payload of the firmware update package; and
   determining that the current power capacity of the battery of the information handling system is greater than the second power required to apply the first payload of the firmware update package, and in response, updating the firmware at the information handling system by applying the first payload of the firmware update package to the firmware.

4. The computer-implemented method of claim 3, further comprising:
   in response to determining that the current capacity of the battery of the information handling system is greater than the second power required to apply the first payload of the firmware update package, obtaining the first payload of the firmware update package;
   determining an integrity of the first payload of the firmware update package;
   in response to determining the integrity of the first payload of the firmware update package, updating the firmware at the information handling system by applying the first payload of the firmware update package to the firmware;
   determining whether the firmware update package includes additional payloads; and
   in response to determining that the firmware update package does not include additional payloads, clearing the flag indicating that the payloads of the firmware update package have been staged.

5. The computer-implemented method of claim 4, further comprising:
- in response to determining that the firmware update package includes additional payloads, identifying a second payload of the firmware update package;
- determining, at a third time after the second time, a third power required to apply the second payload of the firmware update package based at least on the firmware update duration map and the health of the battery of the information handling system;
- comparing the current power capacity of the battery of the information handling system with the third power required to apply the second payload of the firmware update package; and
- determining that the current capacity of the battery of the information handling system is greater than the third power required to apply the second payload of the firmware update package, and in response, updating the firmware at the information handling system by applying the second payload of the firmware update package to the firmware.

6. The computer-implemented method of claim 1, further comprising:
- further in response to determining that the current capacity of the battery of the information handling system is greater than the first power required to apply the first payload of the firmware update package:
  - providing a notification to a display device of the information handling system indicating an approval status of applying the first payload of the firmware update package to the firmware; and
  - in response to provide the notification, receiving user-input indicating approval of applying the first payload of the firmware update package to the firmware.

7. The computer-implemented method of claim 6, further comprising:
- in response to receiving the user-input indicating the approval of applying the first payload of the firmware update package to the firmware, rebooting the information handling system.

8. The computer-implemented method of claim 1, further comprising:
- determining that the current capacity of the battery of the information handling system is less than the first power required to apply the first payload of the firmware update package, and in response, registering for a notification when the current capacity of the battery of the information handling system is greater than the first power required to apply the first payload of the firmware update package.

9. An information handling system comprising a processor having access to memory media storing instructions executable by the processor to perform operations, comprising:
- receiving a firmware update package, the firmware update package including multiple payloads and a firmware update duration map;
- verifying an integrity of the firmware update duration map;
- in response to verifying the integrity of the firmware update duration map, extracting the firmware update duration map from the firmware update package;
- determining, at a first time, a first power required to apply a first payload of the firmware update package based at least on the firmware update duration map and a health of a battery of the information handling system;
- comparing a current power capacity of the battery of the information handling system with the first power required to apply the first payload of the firmware update package;
- determining that the current power capacity of the battery of the information handling system is greater than the first power required to apply the first payload of the firmware update package, and in response:
  - obtaining the first payload of the firmware update package; and
  - updating firmware at the information handling system by applying the first payload of the firmware update package to the firmware.

10. The information handling system of claim 9, the operations further comprising:
- after receiving the firmware update package, staging the payloads of the firmware update package; and
- setting a flag indicating that the payloads of the firmware update package have been staged.

11. The information handling system of claim 10, the operations further comprising:
- in response to determining that the current capacity of the battery of the information handling system is greater than the power required to apply the first payload of the firmware update package, determining whether the flag is set to indicate that the payloads of the firmware update package have been staged;
- in response to determining that the flag is set to indicate that the payloads of the firmware update package have been staged, obtaining the first payload of the firmware update package;
- determining, at a second time after the first time, a second power required to apply the first payload of the firmware update package based at least on the firmware update duration map and the health of the battery of the information handling system;
- comparing the current power capacity of the battery of the information handling system with the second power required to apply the first payload of the firmware update package; and
- determining that the current capacity of the battery of the information handling system is greater than the second power required to apply the first payload of the firmware update package, and in response, updating the firmware at the information handling system by applying the first payload of the firmware update package to the firmware.

12. The information handling system of claim 11, the operations further comprising:
- in response to determining that the current capacity of the battery of the information handling system is greater than the second power required to apply the first payload of the firmware update package, obtaining the first payload of the firmware update package;
- determining an integrity of the first payload of the firmware update package;
- in response to determining the integrity of the first payload of the firmware update package, updating the firmware at the information handling system by applying the first payload of the firmware update package to the firmware;
- determining whether the firmware update package includes additional payloads; and
- in response to determining that the firmware update package does not include additional payloads, clearing the flag indicating that the payloads of the firmware update package have been staged.

13. The information handling system of claim 12, the operations further comprising:
   in response to determining that the firmware update package includes additional payloads, identifying a second payload of the firmware update package;
   determining, at a third time after the second time, a third power required to apply the second payload of the firmware update package based at least on the firmware update duration map and the health of the battery of the information handling system;
   comparing the current power capacity of the battery of the information handling system with the third power required to apply the second payload of the firmware update package; and
   determining that the current capacity of the battery of the information handling system is greater than the third power required to apply the second payload of the firmware update package, and in response, updating the firmware at the information handling system by applying the second payload of the firmware update package to the firmware.

14. The information handling system of claim 9, the operations further comprising:
   further in response to determining that the current capacity of the battery of the information handling system is greater than the first power required to apply the first payload of the firmware update package:
      providing a notification to a display device of the information handling system indicating an approval status of applying the first payload of the firmware update package to the firmware; and
      in response to provide the notification, receiving user-input indicating approval of applying the first payload of the firmware update package to the firmware.

15. The information handling system of claim 14, the operations further comprising:
   in response to receiving the user-input indicating the approval of applying the first payload of the firmware update package to the firmware, rebooting the information handling system.

16. The information handling system of claim 9, the operations further comprising:
   determining that the current capacity of the battery of the information handling system is less than the first power required to apply the first payload of the firmware update package, and in response, registering for a notification when the current capacity of the battery of the information handling system is greater than the first power required to apply the first payload of the firmware update package.

17. A non-transitory computer-readable medium storing software comprising instructions executable by one or more computers which, upon such execution, cause the one or more computers to perform operations comprising:
   receiving a firmware update package, the firmware update package including multiple payloads and a firmware update duration map;
   verifying an integrity of the firmware update duration map;
   in response to verifying the integrity of the firmware update duration map, extracting the firmware update duration map from the firmware update package;
   determining, at a first time, a first power required to apply a first payload of the firmware update package based at least on the firmware update duration map and a health of a battery of the information handling system;
   comparing a current power capacity of the battery of the information handling system with the first power required to apply the first payload of the firmware update package;
   determining that the current power capacity of the battery of the information handling system is greater than the first power required to apply the first payload of the firmware update package, and in response:
      obtaining the first payload of the firmware update package; and
      updating firmware at the information handling system by applying the first payload of the firmware update package to the firmware.

18. The computer-readable medium of claim 17, the operations further comprising:
   after receiving the firmware update package, staging the payloads of the firmware update package; and
   setting a flag indicating that the payloads of the firmware update package have been staged.

19. The computer-readable medium of claim 18, the operations further comprising:
   in response to determining that the current capacity of the battery of the information handling system is greater than the power required to apply the first payload of the firmware update package, determining whether the flag is set to indicate that the payloads of the firmware update package have been staged;
   in response to determining that the flag is set to indicate that the payloads of the firmware update package have been staged, obtaining the first payload of the firmware update package;
   determining, at a second time after the first time, a second power required to apply the first payload of the firmware update package based at least on the firmware update duration map and the health of the battery of the information handling system;
   comparing the current power capacity of the battery of the information handling system with the second power required to apply the first payload of the firmware update package; and
   determining that the current capacity of the battery of the information handling system is greater than the second power required to apply the first payload of the firmware update package, and in response, updating the firmware at the information handling system by applying the first payload of the firmware update package to the firmware.

20. The computer-readable medium of claim 19, the operations further comprising:
   in response to determining that the current capacity of the battery of the information handling system is greater than the second power required to apply the first payload of the firmware update package, obtaining the first payload of the firmware update package;
   determining an integrity of the first payload of the firmware update package;
   in response to determining the integrity of the first payload of the firmware update package, updating the firmware at the information handling system by applying the first payload of the firmware update package to the firmware;
   determining whether the firmware update package includes additional payloads; and
   in response to determining that the firmware update package does not include additional payloads, clearing the flag indicating that the payloads of the firmware update package have been staged.

* * * * *